United States Patent [19]

Kiyosawa

[11] 4,111,577
[45] Sep. 5, 1978

[54] TUBE JOINT

[75] Inventor: Kesaomi Kiyosawa, Tokyo, Japan

[73] Assignee: Nihon Space Union Co., Ltd., Tokyo, Japan

[21] Appl. No.: 788,344

[22] Filed: Apr. 18, 1977

[51] Int. Cl.² ............................................. F16B 7/00
[52] U.S. Cl. ................................... 403/172; 403/298; 403/295
[58] Field of Search .............. 403/298, 295, 292, 280, 403/171, 172, 176

[56] References Cited
U.S. PATENT DOCUMENTS

| | | | |
|---|---|---|---|
| 2,450,820 | 10/1948 | Wilcox | 403/280 X |
| 3,000,656 | 9/1961 | Hollaender | 403/298 |
| 3,532,369 | 10/1970 | Reilly | 403/178 X |
| 3,666,298 | 5/1972 | Reilly | 403/298 X |
| 3,858,989 | 1/1975 | Field | 403/295 X |
| 3,873,220 | 3/1975 | Kashiwabara | 403/292 X |

Primary Examiner—Andrew V. Kundrat
Attorney, Agent, or Firm—Fleit & Jacobson

[57] ABSTRACT

A tube joint made of metal such as zinc and the like having a plurality of protruding longitudinal knurling tools. Each of the knurling tools has a wide root end and a narrow pointed end at the central part of the upper and the lower surfaces and of the right and the left sides of a square prism which has each corner cut off to form a fixed groove from the pointed end to the root end. A slight arcuate-shaped protuberance is provided at the central part of each of the longitudinal knurling tools. The knurling tool with its protuberance forms a joint rod having an outer diameter equal to, or slightly larger than the inner diameter of a square pipe into which the outer diameter of the diagonal in the protuberant part of the knurling tool corresponding to the square prism is inserted, in arbitary directions at the connecting part thereof. A plurality of joint rods are connected at their root ends to form the tube joint.

4 Claims, 4 Drawing Figures

TUBE JOINT

BACKGROUND OF THE INVENTION

This invention relates to a tube joint capable of connecting square tubes; and more particularly it relates to a tube joint made of metal such as zinc and the like which comprises a plurality of joint rods having protruding knurling tools with wide root ends and narrow pointed ends at the central parts of upper and lower surfaces and of right and left sides of a square prism forming each knurling tool. Each corner of the prism is cut off to form a fixed groove extending from the pointed end to the root end. A slight arcuate-shaped protuberance is provided at the central part of each said longitudinal knurling tool. The knurling tool and its protuberance force a joint rod and a plurality of joint rods are connected at their root ends to form the tube joint. Each of the rods has an outer diameter equal to, or slightly larger than the inner diameter of a square pipe into which said outer diameter of the diagonal in the protuberant part of said knurling tool corresponding to the square prism is inserted, in arbitary directions at the connecting part thereof.

The conventional tube joint is made of metals, e.g., as shown in Japanese Utility Model Publication No. 67—22992 and is difficult to connect or detach because a screw bolt is locked by a spanner (as a bolt piece). Further, a method of inserting a tapered plastic material as a packing between the tube and metallic joint has recently been used, but this method has the defect of requiring the use of a wooden hammer in inserting or removing said tapered plastic materials and does not have good efficiency in operation. Further, a tube joint for connecting square pipe which uses a longitudinal knurling tool has recently been developed. However, this tool has been unsatisfactory because it has a smooth plane of the longitudinal knurling tool making contact with the inner diameter of a pipe.

Accordingly, a tube joint made in accordance with the present invention is a novel joint based upon a fundamentally improved technique which avoids the conventional defects.

DETAILED DESCRIPTION OF THE DRAWINGS

Figure 1:
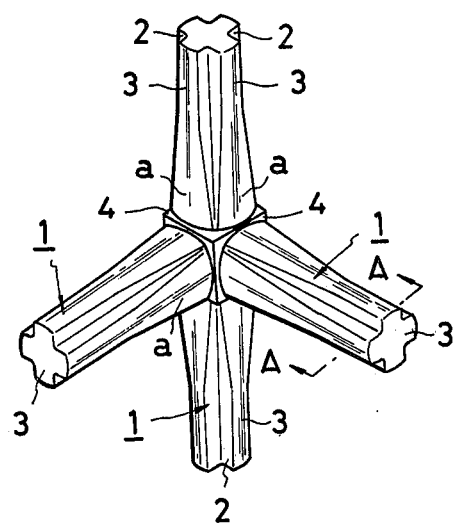
FIG. 1 is a perspective view of the tube joint of this invention.
Figure 2:
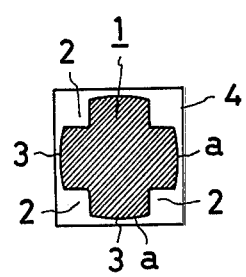
FIG. 2 is a sectional view of FIG. 1 in A—A.

Referring to the example of this invention shown in the drawings, the numerals 1 in FIG. 1 and FIG. 2 are joint rods of square prism type having tapered pointed ends, and curved grooves 2 having narrow root parts and wide pointed end parts formed by deeply cutting off each corner of the square prism. The grooves 2 form four longitudinal knurling tools 3 having wide root parts and narrow pointed ends protruding in equal distances respectively at the central parts of both upper and lower surfaces and of both left and right sides of the square prism. Further, in the center of the surface of each said longitudinal knurling tool 3, there exists a protuberance "a" in arc state and this protuberant part "a" is formed so as to contact closely with an inner wall of a pipe held by the joint rod.

Accordingly, the joint rod 1 is designed so that the surface of the protuberance "a" of the longitudinal knurling tool 3 may completely contact with each inner wall surface of the square pipe, when said joint rod 1 is fittedly inserted into said square pipe.

When observed throughout the joint rod 1 of the tube joint in accordance with this invention, said joint rod 1 has a construction which naturally forms the knurling tool 3 in the center of each surface by making a curved groove at each corner of the square prism having an arc state protuberance in the center.

The numeral 4 identifies a connecting part which connects four joint rods 1 at their root ends. The outer diameters of the joint rods have the same form and same size as that of the pipe inserted onto the joint rod 1, and further both the joint rod and the pipe are formed to be flush when said pipe is inserted.

Although the example described above has referred to a joint in which four joint rods 1 are connected so as to connect four pipes, various modifications are possible by connecting a plurality of joints 1 in arbitrary directions corresponding to the number of pipes to be connected.

Figure 3:
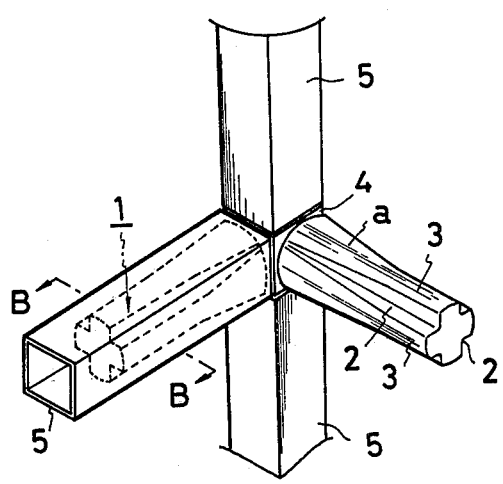
FIG. 3 is a perspective view of the embodiment of FIG. 1 showing pipes connected to the tube joint.
Figure 4:
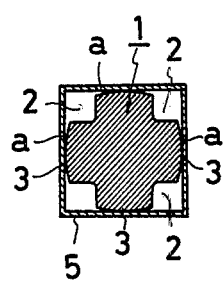
FIG. 4 is a sectional view of FIG. 3 in B—B.

In using the tube joint in accordance with this invention, as shown in FIG. 3 or FIG. 4, when the joint rod 1 is forcibly inserted into the square pipe 5, said joint rod 1 is fittedly inserted into the pipe 5 with the longitudinal knurling tool 3 of the outer periphery of the joint rod entering the pipe 5 first. Finally the protuberance "a" of the longitudinal knurling tool 3 contacts so closely with the inner wall of said pipe 5 that the joint rod 1 does not fall off or move easily.

Removing the tube joint from the pipe 5 is easily performed by pulling said tube joint and pipe 5 in opposite directions while revolving said pipe 5.

The tube joint in accordance with this invention can be cheaply produced in large quantities because it is integrally formed from metal such as zinc and can be die cast. The surface of the tube joint is treated with a fixed plating.

Because the tube joint in accordance with this invention, as described above, has the knurling tools having the protuberant surfaces in arc state at middle parts of the upper and lower surfaces and of left and right sides respectively, these knurling tools can lead the joint rods so as to fittedly insert them into said square pipe. Further, this knurling tool makes the insertion of the pipe smooth because it has a considerable elasticity, and once the insertion stops, the protuberant part of this surface contacts so closely to the inner wall of the pipe that it prevents movement of the pipe and also provides a smooth surface while the pipe is being drawn out.

Further, in the tube joint according to this invention, four corners of each joint rod are cut off by the groove and the middle parts of the knurling tools left in the four surfaces are in arc formation. Accordingly, even if there are some variations in the size of the square pipe, there is no risk that said pipe will fall off from the tube joint because the fit is securely performed by the inner wall of the square pipe contacting closely the protuberant part of the knurling tool. Thus, the square pipe deforms in some degree and the efficiency of the operation is very effective.

I claim:

1. A joint made of metal and adapted to be connected to a plurality of square pipes comprising:

a plurality of protruding joint rods interconnected at their root ends, each joint rod including plural radially protruding, longitudinally extending knurling tools, each with a shaped radial surface having a wide root end close to the root end of the joint rod and a narrow pointed end, the shaped radial surfaces being positioned at central parts of top and bottom and right and left sides of the joint rod, adjacent shaped radial surfaces being separated by fixed grooves extending from the pointed end to the root end of the knurling tool, each of said shaped radial surfaces having an arcuate-shaped protruding portion extending from a central part thereof intermediate the ends of said knurling tool so that the diameter of each joint rod increases from a first value to a second value in a direction from the pointed end to the root end of the knurling tool, the first value being slightly less than the inner diameter of a square pipe to be held by the joint rod and the second value being at least equal to the inner diameter of the square pipe.

2. A joint as claimed in claim 1 wherein the second value of the diameter of the joint rod is greater than the inner diameter of the square pipe to be held by the joint rod.

3. A joint as claimed in claim 1 wherein the metal is zinc.

4. A joint as claimed in claim 1 wherein the protruding joint rod has a square prism section, the corners of the prism being cut off to form the fixed grooves that separate the shaped surfaces from each other.

* * * * *